Oct. 16, 1962 WAY D. WOO 3,059,227
DATA STORAGE AND TRANSFER APPARATUS
Filed Aug. 29, 1958
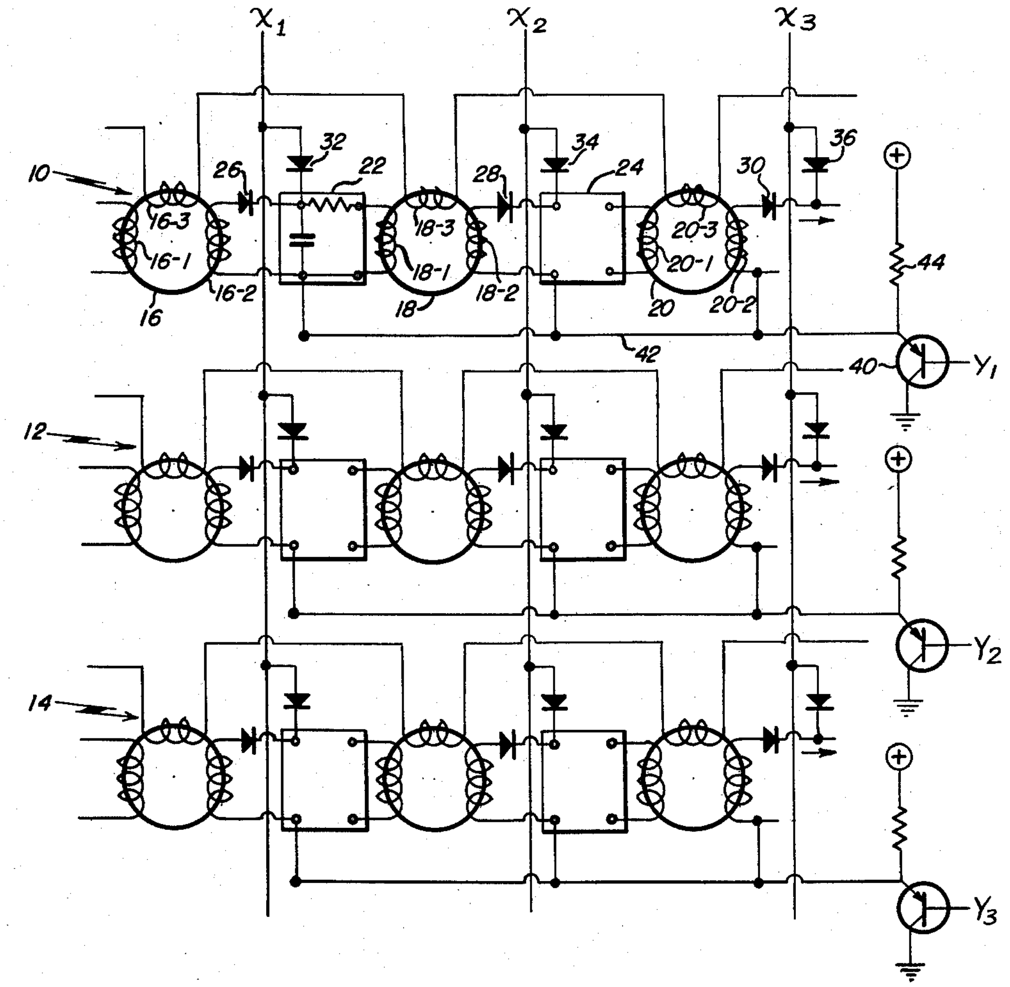
INVENTOR.
WAY DONG WOO
BY Henry L. Hanson
ATTORNEY United States Patent Office 3,059,227

Patented Oct. 16, 1962

3,059,227
DATA STORAGE AND TRANSFER APPARATUS

Way D. Woo, Newton Centre, Mass., assignor to Minneapolis-Honeywell Regulator Company, Minneapolis, Minn., a corporation of Delaware Filed Aug. 29, 1958, Ser. No. 758,123
5 Claims. (Cl. 340—174)

A general object of the present invention is to provide a new and improved apparatus useful in the storing and manipulation of digital data. More specifically, the present invention in concerned with a new and improved data transfer and manipulation circuit which is characterized by its ability to accept parallel information and transmit data therefrom in a serial manner.

In certain types of data processing apparatus, it is frequently desirable to provide digital storage and transfer circuitry which is capable of matching the high digital manipulation rates of a data processor with a relatively low speed device such as a magnetic tape storage device. Such a data handling speed transfer device or speed conversion device in data processing systems is frequently referred to as a buffer.

In accordance with the teachings of the present invention, a new and improved buffer type circuit has been provided by incorporating a new and novel input loading circuit for a plurality of serial shift registers. As taught in the present invention, the storage elements of the buffer unit may be arranged in rows and columns in a matrix type configuration. Data may be loaded into selected serial registers by a unique coupling into the delay line coupling link between the bistable elements in each register. This circuitry is also so arranged that a single switch means is adapted to control the loading in each individual register.

It is accordingly a further object of the present invention to provide a new and improved buffer unit incorporating a plurality of serial type shift registers wherein the data to be loaded into the buffer unit is coupled into selected registers by way of a coupling means between the bistable elements of the register.

Another more specific object of the present invention is to provide a new and improved buffer unit which is adapted to convert parallel type information into serial information by way of a unique loading technique incorporating signal input transfer lines coupled to a transfer link between bistable elements in a serial register in combination with switching means associated with each of the transfer links for selectively controlling the loading into each selected register.

Still another object of the present invention is to provide a plurality of serial shift register circuits each of which can be loaded by a parallel data transfer from a plurality of common input signal lines and each of which can be shifted serially once the register has been loaded even though loading may be going on in another register having the same input lines.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Referring to the single FIGURE, there is here illustrated a plurality of bistable data storage circuits arranged in a matrix type configuration. The matrix configuration comprises a plurality of serial type data shift registers 10, 12, and 14. Each of the serial shift registers 10, 12, and 14 may be of the same general type and, like the register 10, comprise a plurality of bistable magnetic core devices 16, 18, and 20 each formed with an input winding 16–1, 18–1, and 29–1 as well as an output winding 16–2, 18–2, and 20–2. Shift windings 16–3, 18–3, and 20–3, are also adapted to be associated with the cores of the register. Coupling each core output winding with the next input winding of the series is a suitable delay line type coupling means. Thus, the output winding 16–2 is coupled by way of a delay line coupling means 22 to the input winding 18–1. Similarly, a delay line coupling means 24 is coupled between the output winding 18–2 and the input winding 20–1. The delay line coupling means may be of any well known type and in its simplest form may be represented by an R–C network as illustrated for the delay line coupling means 22. A coupling and inverse signal blocking diode 26 is connected in series between the output winding 16–2 and the delay line coupling means 22. Similarly, diode 28 is coupled between the output winding 18–2 and the coupling means 24. A further diode 30 is connected in series with the output winding 20–2.

The register 10 as described thus far is of the conventional single core per bit serial shift register. When data has been inserted in one or more of the cores by a suitable switching of the bistable state of the cores to a predetermined state, this condition may be shifted along the line from left to right by the application of shift signals to the shift windings on each of the cores. As is well known in the art, the application of a shift pulse in a single core per bit serial register has the effect of reading any signal stored in a core out into the associated delay line coupling means. Upon the removal of a shift pulse from the cores, the signal in the delay line coupling means will then be read into the next core in the series. An article discussing in detail a serial type shift register and other circuits employing magnetic core devices will be found in the Proceedings of the I.R.E., volume 43, Number 3, March 1955, entitled, "Logical and Control Functions Performed at Magnetic Cores," by Guterman, et al.

In order to load information into the respective registers, there are provided a plurality of input lines $X_1$, $X_2$, and $X_3$ which are adapted for use in the parallel loading of one or more of the registers 10, 12, and 14. Each of these input signal lines $X_1$, $X_2$ and $X_3$ are coupled to the respective delay lines related to corresponding magnetic core elements in each register. Thus, the line $X_1$ is coupled by way of a diode 32 into a delay line 22. The line $X_2$ is coupled to the delay line 24 by way of a diode 34, and the input line $X_3$ is coupled to the output of core 20 by way of a diode 36.

Similar connections are made to each of the correspondingly related delay line coupling means associated with the other registers 12 and 14.

In order to effect a parallel loading of data into the registers, it is necessary that there be a complete signal path for the input signals from the lines $X_1$, $X_2$ and $X_3$. Insofar as the register 10 is concerned, an electronic switch 40 is provided for connecting a control line 42 to ground. Control line 42 is connected to a terminal of each of the delay line circuits so that a signal may be coupled into the delay line when such a signal is present on the input line. For example, if a signal is present on the line $X_1$ calling for the insertion of a signal into the delay line 22, an electrical circuit may be traced from the line $X_1$ through the diode 32, the condenser on the input of the delay line 22, the control line 42 and the control switch 40 to ground. Thus, with a $Y_1$ signal present on the input of the control switch 40, the presence of a signal on the line $X_1$ may be written into the delay line 22. If a similar signal is present on the lines $X_2$ and $X_3$, a signal will correspondingly be written into the related delay lines associated therewith.

When the $Y_1$ signal is removed from the switch 40, the potential on the control line 42 will become positive by reason of a direct connection of the control line 42 through a resistor 44 to a positive voltage supply terminal. The positive potential at this point may be used to place a bias on the diodes 32, 34, and 36 to prevent any further read in.

In order to load information by parallel read in into the register 12, it is necessary that the signal $Y_2$ be applied to the corresponding control switch so that data may be read into the delay lines associated with the register 12. In a similar manner, information may be loaded into the serial register 14 by applying an appropriate control signal $Y_3$ to the control switch associated with each of the delay lines of this register.

As will be apparent to those skilled in the art, if three separate digital data "words" are to be written into the registers 10, 12 and 14, the words will be applied in succession to the input lines $X_1$, $X_2$, $X_3$ and the first word may be written into the register 10 by way of applying a signal to the control switch 40 having the input signal $Y_1$ connected thereto. If the second word is to be written into the register 12, the signal $Y_1$ operating on the switch 40 will be removed and the corresponding signal $Y_2$ will be applied to the switch of the second register 12. Thus, the second register may have the second word inserted therein.

Similarly, the presence of a third word on the lines $X_1$, $X_2$, $X_3$ may be written into the register 14 by applying the signal $Y_3$ to the control switch therefor. Once the data has been written into one or more of the registers, the data may be serially shifted therefrom by applying shift signals to each of the respective shift windings in each register.

It will be readily apparent that once a particular register has had data inserted therein, it may be serially shifted independently of the loading which may be going on in other registers of the combination. This may be effected for the reason that the coupling diodes such as diodes 32, 34, and 36 from the input lines serve to block any reverse flow of current in the circuit and the delay line in the coupling links are effectively floating in the absence of a grounding signal from the control switch associated therewith. In other words, during a read out, the input control switches should be effectively open circuited so that the positive bias source will be effective in the circuit.

If it is desired to load a particular data "word" into more than one register, the loading may be effected by the simultaneous switching of the input control Y devices associated with the registers where the loading is desired.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure Letters Patent is:

1. A data storage circuit comprising a matrix of bistable storage elements positioned in a plurality of rows and columns, delay line coupling means connected between adjacent storage elements in each row to form each row into a serial data transfer register, a shift line connected to be common to the storage elements of each row, an input control line common to each delay line coupling means of each row, and a separate input signal line means associated with each storage element in each column and connected to the corresponding delay line coupling means by way of an asymmetrically conductive device.

2. A data storage circuit as defined in claim 1 wherein each of said input control lines is connected to switching means so that data may be simultaneously loaded into selected cores of selected rows in said matrix.

3. A data manipulating circuit comprising a plurality of serial shift registers each of which has a plurality of bistable elements therein coupled by signal transfer means, a plurality of input lines coupled to correspondingly related transfer means in each of said shift registers so that said registers may be loaded by a parallel data transfer into said signal transfer means, a separate switching means associated with each shift register and adapted to select the latter for data loading, each of said switching means being connected to complete a plurality of circuits in the selected shift register upon being energized, each of said circuits including a transfer means and its associated input line, and means connected in circuit with each of said input lines to block the flow of signals between said transfer means of said shift register circuits.

4. A data manipulating circuit comprising a plurality of serial shift register circuits each of which has a plurality of bistable elements therein each of which is coupled with the adjacent element by signal transfer means, a plurality of input lines coupled to correspondingly related transfer means in each of said shift registers so that said registers may be loaded by a parallel data transfer into said signal transfer means, separate biasing means connected to the transfer means common to each shift register, said biasing means being operative to block the loading of data into the associated register, and separate switching means connected to the signal transfer means of each shift register to remove the biasing effect of said biasing means and to thereby select the register into which data is to be loaded by way of said input lines.

5. A data storage and transfer circuit comprising a plurality of magnetic core devices connected as bistable storage elements, each of said core devices having an input winding, an output winding, and a shift winding, said plurality of magnetic core devices being arranged in columns and rows, delay line coupling means connecting the output winding of each core in a row to the input winding of the next core in the row to form a serial shift register, a separate input line associated with each column of cores, said input lines being connected to the corresponding delay line coupling means in each shift register, a single bias line connected to all of the coupling means of each register, and a switching means connected to each bias line of each said registers to control the loading of data therein, said switching means being adapted to complete a circuit for each coupling means of the selected register and its associated input line.

References Cited in the file of this patent

UNITED STATES PATENTS

| | | |
|---|---|---|
| 2,778,006 | Guterman | Jan. 15, 1957 |
| 2,825,890 | Ridler et al. | Mar. 4, 1958 |
| 2,872,663 | Kelner et al. | Feb. 3, 1959 |
| 2,884,621 | Ross | Apr. 28, 1959 |
| 2,886,799 | Crooks | May 12, 1959 |
| 2,995,732 | Mintzer | Aug. 8, 1961 |

OTHER REFERENCES

Proceedings of Assoc. of Computing Machinery, May 2 and 3, 1952, pages 207–212, by An Wang.

RCA Technical Notes, published by RCA, RCA Lab., Princeton, N.J., RCA TN No. 121, Sheet 2 of 2, April 1, 1958.